Patented Apr. 9, 1940

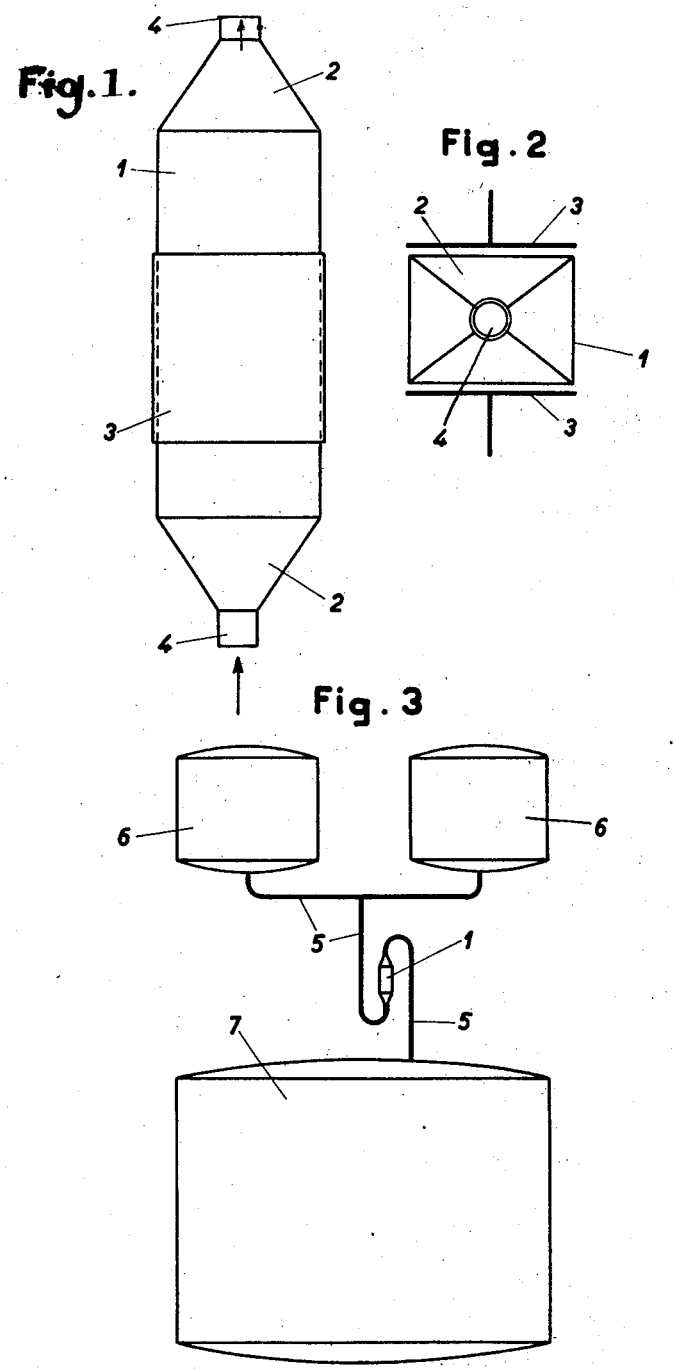

2,196,361

UNITED STATES PATENT OFFICE 2,196,361

METHOD OF PROMOTING THE PROPAGATION AND THE ACTIVITY OF MICROORGANISMS

Paul Liebesny and Hugo Wertheim, Vienna, Austria

Application July 23, 1937, Serial No. 155,312
In Austria July 31, 1936

14 Claims. (Cl. 195—79)

This invention, which involves a modification and further development of the method described in the co-pending applications Serial Nos. 663,642 filed March 30, 1933, now Patent 2,107,830 issued Feb. 8, 1938, and 30,934, filed July 11, 1935, now Patent No. 2,133,103, issued Oct. 11, 1938, relates to promoting the propagation and activity of microorganisms, and is a continuation-in-part of said copending applications.

It is known to favorably influence microorganisms by irradiation with electromagnetic waves of a wave length between 120 meters and 1.8 millimeters.

For the purposes of the present specification the term "short waves" is to be understood as including waves of wave-lengths between 120 meters and 6 meters, the term "ultra short waves" as including wave lengths between 6 meters and 2 meters and the term "extremely short waves" as including waves between 2 meters and 1.8 millimeters. It is also known to influence microorganisms by irradiating the organisms (starting organisms) and causing the same to develop in an inoculation or in a series of inoculations obtained by successive inoculation from one batch to the other, and also irradiating one or some or all of the inoculations. The terms "inoculation" and "inoculations" are herein used to mean the stages of development or propagation separated by operations of inoculation from one batch of substrate to another, or the batches of mash used as substrate. According to the methods hitherto known the quantity of material to be irradiated at any one time, whether such quantity was large or small, was irradiated as such and in its entirety, the procedure being to introduce the vessel containing the entire quantity of material to be irradiated, into the condenser field of a short wave emitter. In view of the fact that on account of these conditions it was only possible to irradiate more or less small batches these prior processes have not proved to be satisfactorily applicable to large scale working. The method according to the present invention has the great advantage of enabling any quantity of material to be irradiated at a time, and therefore of rendering short wave irradiation unrestrictedly applicable on an industrial scale.

The new method according to the present invention consists in carrying out the irradiation of the starting organisms and/or of the inoculations, or of the starting organisms and/or a selection of the inoculations, while the material under treatment is flowing.

As in the case of the methods according to the above-mentioned co-pending applications, there are used in the present method electromagnetic waves of a wave length between 120 meters and 1.8 millimeters. It has proved to be particularly suitable, when working in accordance with the present invention, to employ wave lengths between 15 meters and 56 centimeters. In certain instances it may well prove adequate to irradiate the starting organisms or a single inoculation selected from a sequence of inoculations, and to carry out such irradiation while the material (starting organisms, inoculation batch) is in a state of flux. In certain cases it is advisable, when working according to the present method, to irradiate not fermenting mashes but microorganisms suspended in water or the like, while flowing. The term "inoculation" as used in the later part of this specification is therefore to be understood as meaning not only the fermenting mash at any one stage in the process of propagation by successive inoculations from one batch to the next but also any suspension of microorganisms prepared for the inoculation of a batch of mash or other substrate. Thus, for instance, in the application of the present method in the yeast industry, it is possible to irradiate in suitable containers the culture obtained by inoculation from the starting pure culture, and in addition such of the subsequent inoculations to be developed for propagation purposes, as constitute smaller quantities, while such of the inoculations as constitute larger batches are irradiated under conditions of flow.

The present method enables fermenting processes to be promoted in every respect. For instance, the growth of the fermentation exciting organism and the course of fermentation are capable of being promoted, and the yield of final product increased, by the present method. Since, as already pointed out, both fermenting mashes and also microorganisms in suspension may be irradiated while flowing, the new method is readily applicable in every branch of the fermentation industry. For instance, in the production of acetone and butyl-alcohol by fermentation, or in lactic acid fermentation, i. e. in the manufacturing of lactic acid, the fermenting mashes may be irradiated while flowing, and in the manufacturing of compressed yeast the mashes or alternatively the suspended yeast may be irradiated while flowing.

Some series of experiments led to the unexpected result that in the case of yeast particularly favorable results are attainable when the irradiation is carried out in accordance with the invention, that is to say when the starting organisms (starting yeast) and a number of consecutively developed inoculations are irradiated either while at rest or while flowing, and the last inoculation or inoculations in the series of consecutive batches irradiated while flowing. This method of exerting a favorable influence upon yeast, which when applied to the manufacturing of compressed yeast brings about a very considerable improvement in the quality of the final product (durability, raising power), is preferably carried out in such a manner that a violent irritating action is first exerted upon the yeast cell by irradiation (preliminary irradiation), and then subjecting the thus pre-treated (sensitized) yeast to subsequent irradiation in a stage of propagation in which it is necessary to irradiate under flux. The step of exerting irritation has proved to be an extremely effective pre-treatment. It is of advantage to make the irritation to be exerted upon the yeast cell so powerful that the yeast is checked in its growth; the injury must not of course be carried to such a point that the viability is destroyed and the yeast is incapable of recovering. On the contrary, the conditions of working must be so adjusted that the growth of the yeast is merely checked for a time. During the preliminary irradiation the material may either be at rest or in a state of flux.

The desired sensitizing may be attained or assisted by the application of relatively high voltages. It is not possible to give definite numerical indications of the voltage to be employed, however, since the absolute voltage in the field can not be measured with the means at present available for this purpose. How the necessary high voltages are to be obtained is described at a later stage of the specification.

We have found that the employment of shorter wave lengths in conjunction with high voltages leads to an increase in the sensitizing effect. Good results are obtained with waves below a wave length of about 12 meters. With waves as short as this satisfactory sensitizing results are also obtainable without increasing the voltage to a particularly great extent.

As a general rule it may be stated that the sensitizing should be effected to such a pitch that the desired biopositive effect is achieved by the subsequent irradiation.

The preliminary irradiation may be carried out in such a manner that the starting yeast or two or more inoculations from a sequence of inoculations, are irradiated. Alternatively, yeast, into which fresh mash is allowed to flow at intervals, is irradiated once or several times.

The subsequent irradiation of yeast is effected with one inoculation or with a plurality of inoculations, with the material in flux. In connection with this subsequent irradiating, which is carried out under conditions which ensure the attainment of favorable influencing, it is advisable to aim at intensifying the action by the application of high voltages. The work is done with such high voltages that the duration of irradiation can be reduced to seconds. We have found that the subsequent irradiation (after-irradiation) may with advantage be carried out with waves of a wave length in excess of about 12 meters.

In order to inhibit the increase in temperature that might otherwise occur during irradiation, more particularly during the preliminary irradiation which is of longer duration, the material is artificially cooled during irradiation, and that to such an extent that the temperature is kept under all circumstances under the harmful limit. We have found it advisable to keep yeast, for instance with the aid of suitable temperatured water, at incubation temperature or slightly below this temperature.

The suitable conditions of irradiation in any particular instance must be ascertained by the experimental selection of the number of consecutive inoculations or stages of propagation, the number and duration of individual irradiations, the distribution of the irradiations in respect of the individual inoculations, the thickness of layer of the material irradiated, the charging conditions in the electrolyte, and so forth. To determine the voltage in the secondary circuit the spacing of the electrodes from the material to be irradiated is ascertained empirically. The ascertainment of this factor, as of the suitable wave length and other factors, is effected for the particular apparatus used in any one instance. We have found that the voltage may be increased by various measures, for instance by increasing the voltage in the primary circuit or by placing the electrodes as far apart as possible. Increasing the spacing of the electrodes is restricted, however, by the fact that the current intensity also varies with the spacing of the electrodes.

We have observed that the desired effect can be increased by making the one electrode as small as possible, i. e. so small that the diameter of the electrode is considerably smaller than the cross-section of the object irradiated. In order that the object may be exposed to the irradiation uniformly in its entire extent the other electrode is made at least as great as the cross-section of the object. The irradiating action may be increased also by positioning the material asymmetrically, e. g. as close as possible to one of the electrodes, the other electrode being preferably positioned as far away from the first as is practicable.

As a rule, in whatever branch of the fermentation industry the irradiation is practised, the irradiation of flowing material in accordance with the present invention is carried out on a short section of conduit. The conduit itself may be suitably shaped to form a bulb at the point at which the irradiation is applied, or a special length of conduit or vessel may be inserted in the conduit at such point. It is advantageous to shape the irradiation bulb in such a manner that it is of uniform cross-section at right angles to the direction of flow of the material to be irradiated while its sides facing the electrodes of the short wave emitter are disposed parallel to each other. If this were not done the fermentation exciting organisms flowing through between the electrodes would not be exposed to the irradiation in a uniform thickness of layer, and the treatment would be uneven in its effect on the whole of the material treated. If the bulb has to be differently shaped for any reason there may be disposed around it a vat or well of prismatic or other shape conforming to the above requirements in the matter of shape and cross-section. This well or vat having at least two parallel walls to be connected to the electrodes of the short wave emitter is filled with a liquid having as nearly as possible the same dielectric constant as the material to be irradiated.

It is advisable to irradiate flowing material as it is flowing from one vessel or tank to another. The duration of irradiation may be varied by altering the speed of flow and/or by the employment of bulbs of different cross-sections.

In the accompanying drawing, illustrative of the practising of the present invention, Figs. 1 and 2 show a form of construction of apparatus according to our invention, by way of example. A through flow bulb is shown in Fig. 1 in side elevation and in Fig. 2 in plan view. Fig. 3 shows diagrammatically how the irradiation bulb is disposed in an existing fermentation plant comprising two preliminary fermenting vats and a main fermenting vat.

The bulb consists of a prismatic portion 1 and two tapered end portions 2. Parallel to the wider surfaces of the part 1 there are disposed the electrodes 3. To the ends 2 there are connected the conduit pipes 4. The bulb is preferably so positioned that the flowing liquid travels therein from below upwards, and that for the reason that the liquid should flow through the field of irradiation as smoothly as possible and with the least possible eddy formation. It is also advisable to make the bulb of longitudinal shape, and only very gradually to expand the part through which the liquid is conducted into the condenser field, provided this part has to be expanded at all. The shape of the upper end of the bulb shown in the drawing is necessitated by the fact that it has to be connected at this end to a tube of the same dimensions as the tube connected to the lower end of the bulb.

The position of the irradiation bulb in the plant as a whole depends on the working conditions and method of working in any particular instance. In the case of compressed yeast production the bulb may be interposed in a pipe line leading from a yeast dissolving vat to a fermenting vat or in a separate pipe line through which the fermenting mash flows. In the case of the production of acetone and butanol the bulb is interposed, as shown by way of example in Fig. 3, in the pipe line 5 leading from the preliminary fermenting vats 6 to the main fermenting vat 7. With the arrangement shown in the drawing the total quantity of material subjected to preliminary fermentation passes through the bulb.

The described bulbs are made from material which is pervious, as nearly as possible without loss, to the electromagnetic waves used. Examples of materials of this description are glass, ceramic materials, or special compositions or materials produced for these purposes.

While we have hereinabove set forth our invention in general terms and so broadly that those skilled in the art will know how to apply it, we also append the following examples in which our invention is applied to various organisms, various media and in various wave lengths.

We offer these examples as in no sense limitations of our invention but simply as illustrations of certain ways of applying it.

The scope of the invention is described in the claims.

Examples (1) Molasses of 8° Balling containing appropriate nutrient additions is inoculated with pure culture yeast in a test-tube. The test tube is then irradiated in the condenser field of a short wave emitter of 1.5 kw. output. The irradiation is carried out with a 4 meter wave three times in the day for 20 minutes each time, with such adjustment of the heating voltage, the anode voltage, and the grid voltage, that the maximum intensity corresponding to the 4 meter wave is attained. During irradiation the test-tube is immersed in a prismatic cooling bath of approximately 2 liters capacity. One of the electrodes, which is 110 mm. in diameter, is disposed at a distance of approximately ½ cm. from the cooling bath, while the other electrode, which is 40 mm. in diameter, is spaced 60 cm. from the first-mentioned electrode. The cooling is so effected that a temperature of 28° C. is maintained inside the test-tube. After irradiation, the contents of the test-tube are transferred to a fresh nutrient substrate of the same nature as that first used, in a flask of 300 cc. capacity, after which this flask is irradiated under the same conditions as the test-tube. The contents of the flask were then used to inoculate nutrient substrate in a glass vessel of 5 liters capacity, and irradiation once more carried out as before. For the purpose of this latter irradiation the cooling bath is suitably increased in size to accommodate the 5 liter vessel, and the electrode near the cooling vat increased in size to a diameter of 210 mm.; otherwise the conditions under which the glass vessel is irradiated are the same as those under which the test-tube was irradiated, and the flask. The yeast suspension irradiated in the glass vessel is introduced, after 24 hours, into a pure culture apparatus of the type commonly used in yeast factories, and propagated, likewise in the usual manner, up to the third generation, without repetition of irradiation. The starting yeast for the fourth generation is irradiated, with the aid of the same emitter, with the 15 meter wave at the appropriate intensity of 280 milliamperes anode current strength found for this emitter, in a through-flow bulb. The electrodes used are 25 cm. in diameter and spaced 36 cm. apart. The duration of irradiation is such that the particles of the material treated pass through the condenser field in 30 seconds. The starting yeast for the fifth generation is irradiated at an intensity of only 200 milliamperes anode current strength, for a shorter time (the particles of the material treated traversing the field in 9 seconds), but otherwise under the same conditions as the starting yeast for the fourth generation. Measurement of yield shows an increase of 10% in the fifth generation, as compared with yeast produced in precisely the same way but without irradiation. The raising power of the irradiated yeast shows an improvement of 5 minutes.

(2) Same procedure as in Example 1 except for the fact that the duration of fermentation in the fifth generation is shortened by 3 hours as compared with the normal duration of fermentation. In spite of this shortening of the duration of fermentation it is found that the yield is the same as with the normal duration of fermentation but without irradiation. Moreover, the raising power is found to be shortened by 15 minutes.

(3) Clostridium butyricum is irradiated in a vessel in the condenser field of a short wave emitter. The irradiated organisms are inoculated twice on to further batches, and these batches irradiated under the same conditions as the starting organisms, that is to say again in a vessel. The latter of the two inoculations is then used to start the preliminary fermentation. The mash of the preliminary fermentation (the third inoculation) is irradiated in a through flow bulb interposed in the pipe line leading from the preliminary fermenting vat to the main fermenting vat. Yield determination after the main fermentation shows an increase of about 4% in the yield of products of fermentation as compared with the yield of the same procedure without irradiation.

We claim:

1. The method of promoting the propagation and activity of microorganisms, which consists in irradiating the microorganisms to be influenced in a condenser field of from 1.8 mm. to 120 m. wave length, while the material irradiated is flowing, maintaining the temperature below the harmful limit and causing the thus irradiated microorganisms to develop in a series of inoculations obtained by consecutive inoculation on to fresh substrates.

2. The method as claimed in claim 1, wherein at least one inoculation selected from the said series is irradiated likewise in a condenser while the material of the selected inoculation is at rest, and maintained at a temperature in the neighborhood of the incubation temperature of the microorganism.

3. Method of promoting the propagation and activity of microorganisms, which consists in causing the organisms to develop in a series of inoculations obtained by consecutive inoculation on to fresh substrates, irradiating the starting organisms and at least one inoculation selected from this series in a condenser field of a wave length of from 1.8 mm. to 120 m. while these irradiated organisms are at rest, and then irradiating at least one inoculation selected also from the said series likewise in a condenser field ranging from 1.8 mm. to 120 m. wave length, while the selected inoculation is flowing during each irradiation period, the temperature being kept in the neighborhood of the incubation temperature of the organism being irradiated.

4. Method of promoting the propagation and activity of microorganisms, which consists in developing the microorganisms to be influenced on nutritive foundations in a series of three to nine consecutive inoculations and in irradiating in the condenser field of a short wave emitter at least one of these inoculations while the material irradiated is at rest, and at least one of the inoculations while the material irradiated is flowing during each period of irradiation the temperature being maintained in the neighborhood of the incubation temperature of the organism being irradiated.

5. Method of promoting the propagation and activity of microorganisms, which consists in developing the microorganisms to be influenced on nutritive foundations in a series of three to nine consecutive inoculations, and in irradiating in the condenser field of a short wave emitter at least one of these inoculations in several periods while the material irradiated is at rest, and at least one of the inoculations while the material irradiated is flowing during each period of irradiation the temperature being maintained in the neighborhood of the incubation temperature of the organism being irradiated.

6. Method as claimed in claim 4 wherein the irradiation of the flowing material is performed while the material is flowing in an upward direction.

7. Method of promoting the growth and activity of yeast, which consists in irradiating yeast on a nutritive foundation in a condenser field of a wave length ranging from 1.8 mm. to 120 m. at rest and maintained at a temperature in the neighborhood of the incubation temperature of the yeast, causing the irradiated material to develop in a series of three to nine inoculations obtained by consecutive inoculation on to fresh substrates, and irradiating at least one of the said inoculations likewise in a condenser field ranging from 1.8 mm. to 120 m. wave length while flowing.

8. Method of promoting the growth and activity of yeast, which consists in developing yeast in a series of inoculations obtained by consecutive inoculation on to fresh substrates, and in irradiating in the condenser field of a short wave emitter at least one of these inoculations while the material irradiated is at rest, and at least one of said inoculations while the material irradiated is flowing, and while cooling every batch of irradiated material to a temperature of 28° C.

9. Method of manufacturing yeast which consists in developing yeast in a series of inoculations exerting a powerful checking irradiation upon the yeast cell by preliminary irradiation of at least one inoculation of the said series in the condenser field of a short wave emitter with the employment of high voltage while the material is at rest and maintained at a temperature in the neighborhood of the incubation temperature of the yeast and then exerting a promoting after-irradiation by irradiating at least one inoculation selected also from the said series likewise in the condenser field of a short wave emitter while this selected inoculation is flowing during each period of irradiation maintaining the temperature of the yeast in the neighborhood of its incubation temperature.

10. Method as claimed in claim 9, in which the said after-irradiation is effected at high voltage.

11. Method of promoting the growth and activity of yeast, which consists in developing yeast in a series of inoculations exerting a powerful checking irradiation upon the yeast cell by preliminary irradiation of at least one inoculation of the said series in a condenser field ranging from 1.8 mm. to 12 m. wave length with the employment of high voltage while the material is at rest and maintained at a temperature in the neighborhood of the incubation temperature of the yeast and then exerting a promoting after-irradiation by irradiating at least one inoculation selected also from the said series in a condenser field ranging from 12 to 120 meters wave length while the selected inoculation is flowing during each period of irradiation maintaining the temperature of the yeast in the neighborhood of its incubation temperature.

12. Method as claimed in claim 9 wherein the object irradiated is asymmetrically positioned with respect to the electrodes of said short wave emitter.

13. Method as claimed in claim 9 in which said short waves radiating from a fine point.

14. The method of increasing the yeast yield in the manufacturing of compressed yeast, which consists in irradiating yeast on a nutritive foundation in a condenser field of a wave length ranging from 1.8 mm. to 12 meters, with the employment of high voltage, while the material irradiated is at rest and maintained at a temperature in the neighborhood of the incubation temperature of the yeast, causing the irradiated material to develop in a series of eight inoculations obtained by consecutive inoculation on to fresh substrates, and irradiating the first two of the said eight inoculations in the same condenser field and likewise at rest, and irradiating the starting yeast for the fourth and fifth generations of the run in a condenser field of a wave length ranging from 12 to 120 meters, at high voltage, while the material irradiated is flowing during each period of irradiation maintaining the temperature of the yeast in the neighborhood of its incubation temperature.

PAUL LIEBESNY.
HUGO WERTHEIM.